United States Patent

[11] 3,596,842

[72] Inventor Delbert K. Barber
    Dearborn, Mich.
[21] Appl. No. 804,510
[22] Filed Mar. 5, 1969
[45] Patented Aug. 3, 1971
[73] Assignee Superior Tea and Coffee Company
    Chicago, Ill.

[54] MACHINE FOR SEPARATING A GRANULAR SUBSTANCE FROM A CONTAINER OF PAPER OR THE LIKE
2 Claims, 7 Drawing Figs.

[52] U.S. Cl.................................................. 241/222,
    209/3, 214/305, 222/342, 241/2, 241/79.2,
    241/166, 241/236
[51] Int. Cl................................................... B02c 18/06,
    B02c 18/22
[50] Field of Search......................................... 241/2, 14,
    24, 79, 79.2, 166—167, 222—225, 236, 101;
    214/305; 221/266; 222/342, 368; 209/3,
    233—235, 315, 322

[56] References Cited
UNITED STATES PATENTS
| | | | |
|---|---|---|---|
| 661,969 | 11/1900 | Fuhr.............................. | 241/79.2 |
| 2,321,869 | 6/1943 | Stanyer......................... | 222/342 |
| 2,818,985 | 1/1958 | Irmscher........................ | 214/305 |
| 3,396,914 | 8/1968 | Liebman........................ | 241/236 |

Primary Examiner—Donald G Kelly
Attorney—Leonard S. Knox

ABSTRACT: A machine for receiving closed packages of paper or other tearable material containing a granular substance, tearing the walls of the package to a substantial degree by the use of toothed means, delivering the remnants of the torn package and the contents to a vibrating screen having interstices to pass the substance to a hopper therebelow, the screen being inclined to deliver the remnants to one collecting point and the hopper being inclined to deliver the substance to another collecting point.

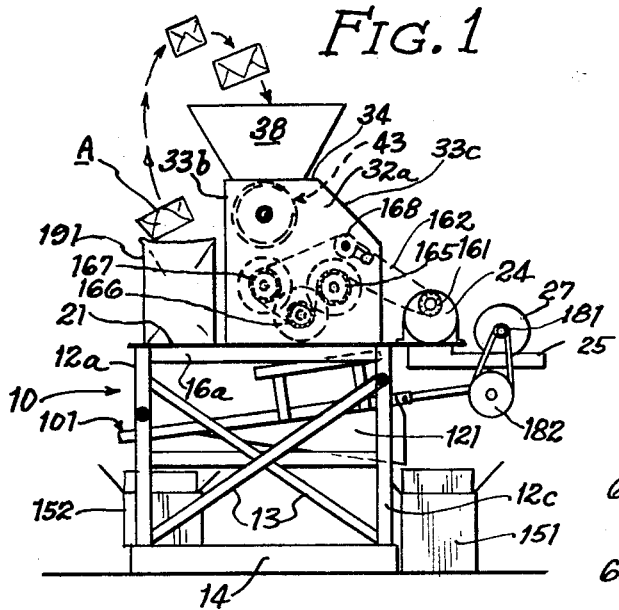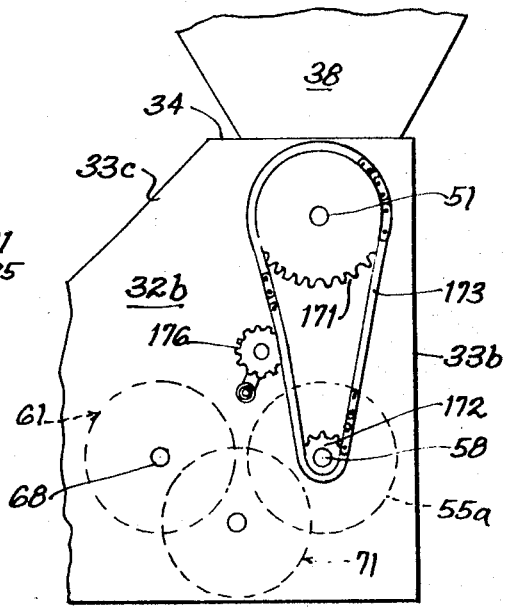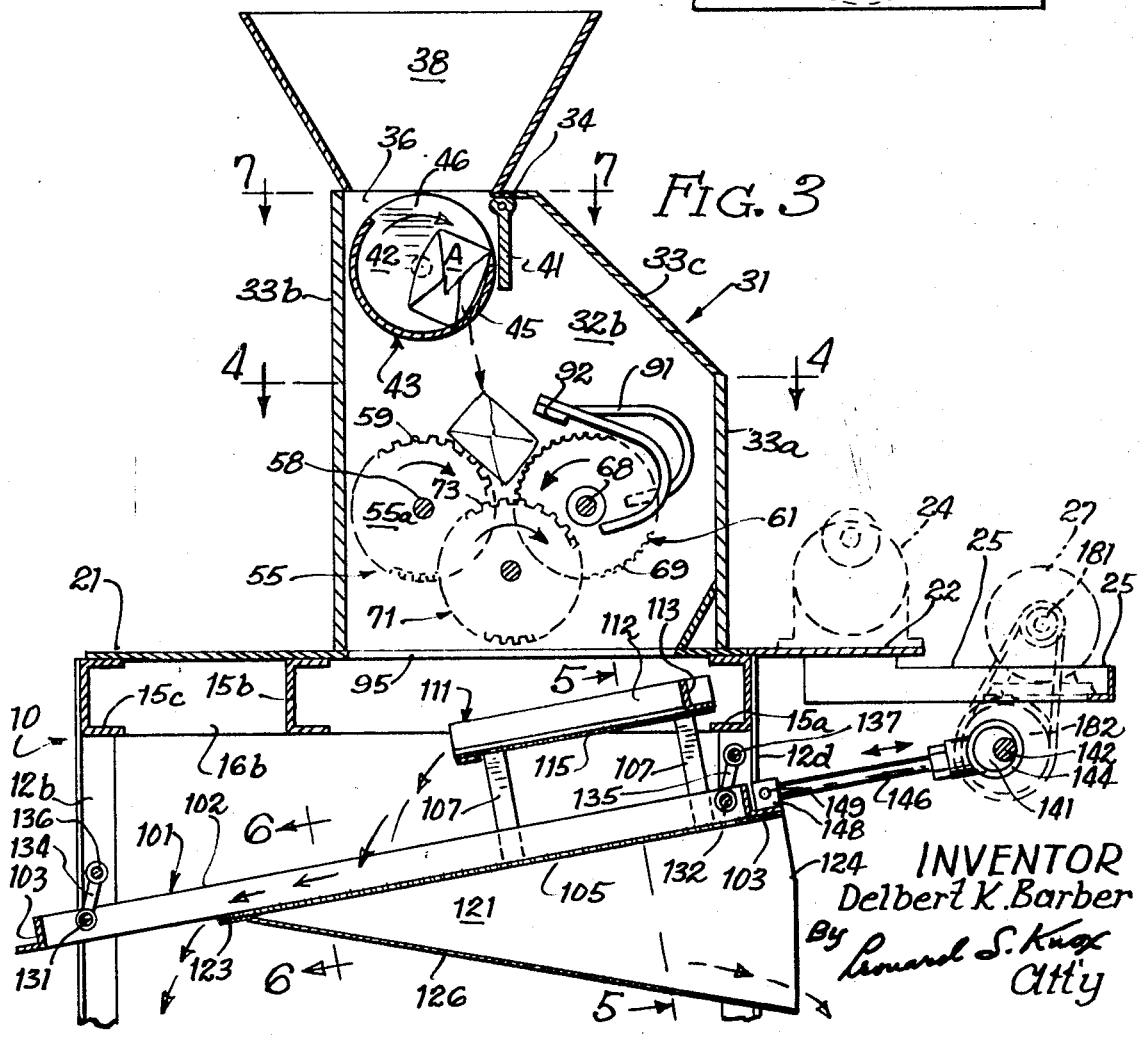

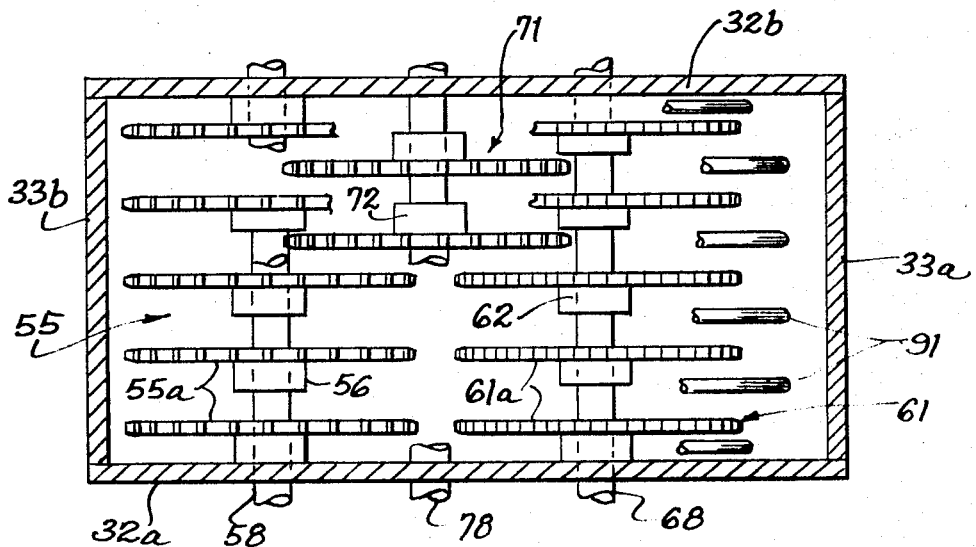
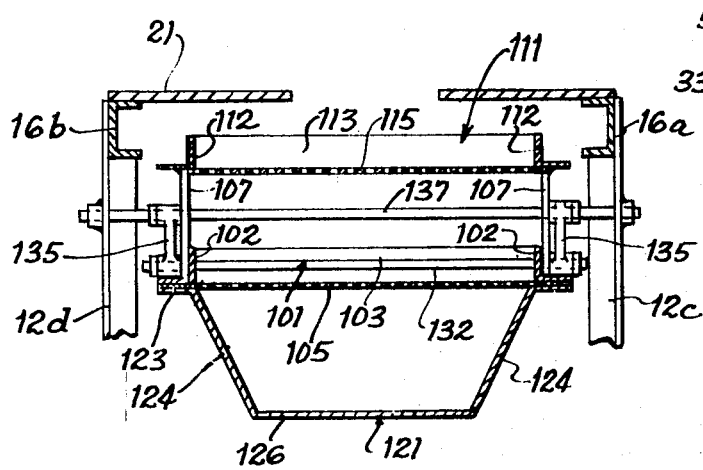
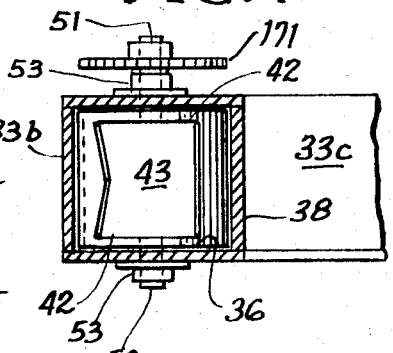
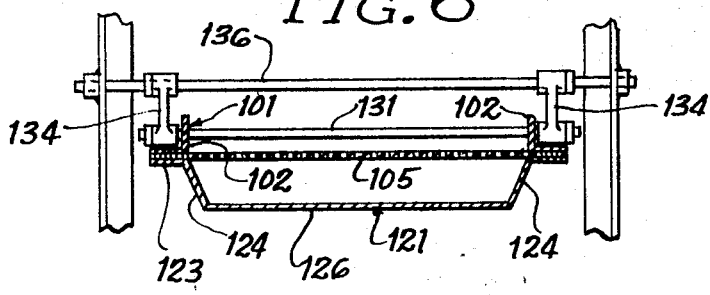

MACHINE FOR SEPARATING A GRANULAR SUBSTANCE FROM A CONTAINER OF PAPER OR THE LIKE

BACKGROUND OF THE INVENTION

In the business of packaging ground coffee in bags for sale, e.g. to restaurants, hotels, institutions and similar establishments, it has been the practice to indicate the last date upon which the coffee should desirably be used, for the reason that freshness of the product is a primary requisite. This does not mean that the coffee will be unfit for consumption after that date, but that more recently roasted and ground coffee is obviously preferred. Wholesalers therefore have a policy of accepting the return of "outdated" coffee and replacing the same. Since the returned coffee has a definite market in which absolute freshness is not demanded and in which a lower price is a prime consideration it becomes necessary or desirable to repackage such coffee, with or without the addition of fresher coffee, for this other market in the most economical manner.

To allocate personnel to open and empty the packages manually, and then discard the same is, in these days of high labor cost, impractical and expensive.

SUMMARY OF THE INVENTION

In order to avoid the expense referred to, the present invention comprehends a machine to receive the closed packages, subject the same to tearing to readily release the contents and to deliver the remnants of the packages and contents to a vibrating screen. The interstices of the screen are of a size to pass the coffee but not the remnants. Below the screen is an open-ended hopper into which the screened coffee passes. The hopper has an inclined bottom and is also arranged to vibrate in order that the coffee may be discharged at the open end and into a receptacle. The screen is inclined oppositely to the bottom of the hopper to shake the remnants of the package into another receptacle. The invention also comprehends the method of performing these steps.

The completed packages are first deposited in a hopper, at the bottom of which is a gate, desirably a revolving gate, which is adapted to accommodate only one or two packages at a time and, upon revolution of the gate, the packages are dropped into tearing means. This latter preferably comprises cooperating sets of toothed wheels whereby the package is effectively and sufficiently torn in a number of places to release the contents. To insure that all of the coffee is salvaged the vibrating screen subjects the torn parts of the bag to further agitation. It will become apparent that, by reason of the gate, the operative is prevented from feeding an excessive number of packages directly to the tearing means with the possibility of jamming. Further, since, in a preferred form, the tearing means comprises several sets of parallel, toothed wheels carried in interdigitated relation on respective shafts, fingers are located between the wheels of at least one set to dislodge paper scrap which may accumulate therebetween.

BRIEF DESCRIPTION OF THE DRAWINGS

FIG. 1 is a side elevational view of the machine;
FIG. 2 is a detail to show a part of the driving mechanism;
FIG. 3 is a vertical cross section with some parts in elevation;
FIG. 4 is a cross section taken on the line 4—4 of FIG. 3;
FIG. 5 is a cross section taken on the line 5—5 of FIG. 3;
FIG. 6 is a cross section taken on the line 6—6 of FIG. 3; and
FIG. 7 is a cross section taken on the line 7—7 of FIG. 3.

DESCRIPTION OF THE PREFERRED EMBODIMENT

Adverting to the drawings, there is shown, by way of example, one form of machine for carrying out the principles of the invention. A framework 10 is constituted of legs 12a, 12b, 12c and 12d having conventional struts 13 at each side. A base 14 of any convenient form may be provided and to which the lower end of the legs 12a, etc. are affixed. The top end of the pairs of legs 12a, 12c and 12b are respectively secured to opposite ends of side struts 16a and 16b as well as the opposite ends of transverse struts, 15a and 15c. An intermediate strut 15b extends between the side struts 16a, 16b. All of the several members are joined by welding or otherwise to provide a rigid, boxlike structure.

A baseplate 21 overlies, and is secured to the top of the framework 10 and has an overhanging extension 22 to carry a main driving motor 24. This extension carries a subframe 25 supporting a second driving motor 27. It will be apparent that a single motor and suitable speed-changing mechanism may be substituted.

Surmounting the baseplate 21 and secured thereto is a boxlike structure 31 having sidewalls 32a, 32b, end walls 33a, 33b, 33c and a top wall 34. There is an opening 36 in the wall 34 corresponding to the lower end of a loading hopper 38.

Secured between the walls 32a, 32b is a swinging partition 41 defining, with the said walls and the wall 33b a throat space within which a rotary gate 43 is contained. This gate is a hollow cylinder 45 which is open over a portion of its circumference to form an entrance 46. The gate has end walls 42—42. The trailing side 46 of the wall 45 is desirably V-shaped or otherwise formed to seize the package in the hopper, carry it to the interior of the gate and, upon rotation thereof, drop it to the tearing mechanism. The V- or other shape of the trailing side 46 is designed to effect preliminary puncture of the package during seizure thereof. Should a package or packages not be received completely within the gate the partition 41 will be displaced thereby to avoid jamming. The partition may be biased toward the gate by gravity or spring means. FIG. 3 shows one package A within the gate which is shown as rotating clockwise. The end walls 42, 42 are provided with stub shafts 51, 52 carried in bearings 53, 53. The arrangement for driving the gate 43 will be referred to subsequently.

Situated below the gate 43 is tearing means comprising three sets of toothed wheels (FIGS. 3 and 4). The set 55 consists of a plurality of wheels 55a, each having a hub 56 keyed to a common shaft 58. The teeth 59 in the example are preferably blunt nosed with beveled edges and with a circular pitch of about 1 inch. The set of wheels 61 consists of a plurality of wheels 61a, each having a hub 62 keyed to a common shaft 68. The teeth 69 are preferably sharp with a circular pitch of about one-half inch. The third, or intermediate set of wheels 71, each has a hub 72 keyed to a common shaft 78, and the teeth 73 are desirably of the same configuration as the teeth 59. It will be seen that the set of wheels 71 is interdigitated with the other two sets. All of the shafts are carried in suitable bearings in the walls 32a, 32b. Rotation is clockwise for the set 55, counterclockwise for the set 61 and clockwise for the set 71, in order to direct the scrap paper on to an auxiliary screen to be described. It will be clear from the drawing that the combined action of the several sets of toothed wheels will efficiently tear the packages dropped thereinto from the gate 43. The shape of the teeth and their spacing is not critical as long as the package is torn apart in such a way as to insure that the coffee therein is released. Research has demonstrated that the somewhat more pointed teeth 69 result in improved tearing action, it being found that the somewhat blunt teeth of the other wheels tend to hold the bags momentarily while tearing occurs. As will become apparent subsequently, the torn pieces are subjected to additional agitation to free coffee which may be retained in pockets of the fragments.

To eliminate fragments of paper which may be trapped between the wheels of a set, a plurality of fixed fingers are located between adjacent wheels and are so shaped as to dislodge such fragments or to reorient the same for seizing by one or both of the other sets and eventual delivery to the screen to be described. Although the fingers 91 are shown, by way of example, as carried on a fixed support 92, it will be understood that swinging or other motion may be imparted thereto in order to sweep most effectively over the spaces between the wheels. Moreover, even though the fingers 91 are shown only in connection with the set of wheels 61 it will be evident that the remaining sets may, if desired, be equipped similarly.

The baseplate 21 has an aperture 95 through which the coffee and paper fragments may exit. Below the base plate 21 there is an arrangement of screens and a hopper for accepting the coffee and the torn pieces of paper and separating one from the other. To this end there is provided an inclined frame 101 comprising side members 102, 102 and end members 103, 103, this frame being inclined downwardly to the left (FIG. 3). The angle of inclination is not critical and may be established empirically to achieve agitation of the torn fragments toward the left at a rate adequate to avoid pileup while permitting the coffee sufficient opportunity to pass through the screen.

The frame 101 supports, by means of struts 107, a subframe 111 consisting of side members 112, 112 and an end member 113. A first screen 115 of mesh or perforated metal is secured to the bottom of the frame 111. This screen is of an area and is so located as to receive the coffee which has been released by the tearing means and which falls through the opening 95, and is inclined downwardly toward the left in order that the agitation thereof will deliver the torn pieces of the package toward the left. A second screen 105 is secured to the bottom of the frame 101 and extends over an area sufficient to receive the coffee falling through the first screen 115 as well as the torn pieces of paper falling over the left edge of the latter. The two-stage separation of the coffee from the torn package and paper remnants assures thorough recovery of the coffee.

Below the screen 105 is a hopper 121 having a flanged edge 123 attached to the frame 101, sides 124, 124 and a bottom 126, the latter being inclined downwardly to the right.

The frame 101 and the several components carried thereby are supported on rods 131, 132, the ends whereof are carried in one end of links 134, 134 and 135, 135 respectively. The opposite ends of the links are carried on rods 136, 137 respectively, these latter being secured in the legs 12a, 12b, 12c and 12d. Thus, the entire screen-hopper assembly is suspended for oscillatory movement. Oscillation is imparted by an eccentric 141 keyed to a shaft 142, to which detailed reference will be made shortly. The yoke 144 of the eccentric 141 is fitted to one end of a connecting rod 146, at the other end of which is an apertured block 148 pivoted at 149 to the frame 101. Thus, upon rotation of the shaft 142 the screen-hopper assembly is oscillated to facilitate passage of the coffee through the screens 115 and 105, into the hopper 121 and thence to a box or other receptacle 151. Meanwhile the torn pieces of paper are vibrated toward the left and into a second receptacle 152.

The motor 24 is equipped with a speed reducer (not shown), the output side of which has a sprocket 161 driving a chain 162 which, in turn, drives sprockets 165, 166 and 167 keyed to the shafts 68, 78 and 58 respectively. An idler sprocket 168 of conventional construction accommodates for slack in the chain.

The stub shaft 51 (FIG. 7) carries a sprocket 171 and the shaft 58 a sprocket 172, over which a chain 173 passes to rotate the gate 43. An idler 176 of conventional form bears on the chain.

The motor 27 has a pulley 181 which drives a pulley 182 keyed to the shaft 142, whereby to rotate the eccentric 141.

It will be obvious that a single motor and appropriate driving connections may be substituted for the two motors of the example. However, there is some advantage in using the separate motor, as it allows independent selection of speeds for the screen-hopper assembly on the one hand, and the rotary gate and tearing mechanism on the other.

Adverting to FIG. 1, it will be understood that the operator stands at the left, removes the full packages A from a bag or carton 191 and deposits them in the hopper 38. Should the operator overload the hopper, no misfunction will occur as the rotary gate will accept only so many packages and no more.

I claim:

1. A machine for emptying packages containing granular substance, the package combining material capable of being torn to free the contents for discharge comprising: means to tear the package, a hopper to receive the packages, said hopper having a bottom outlet, a gate positioned in said outlet to control delivery of the packages to the tearing means, said gate comprising a hollow cylinder having a portion of its lateral wall open to receive one or more packages during one part of a revolution and, during a subsequent part of a revolution, to release said packages for delivery to the tearing means, the margin of the opening having a V-shaped projection on its trailing side to tear the package.

2. The combination in accordance with claim 1 further characterized in that the hopper is defined by wall portions adjacent the gate being spaced from the gate by a distance less than the minimum dimension of the package to preclude short-circuiting of a package past the gate, at least one of the walls opposite the gate opening being yieldably mounted whereby a package which protrudes beyond the periphery of the gate will deflect said gate in passing whereby to preclude jamming.